US009898309B2

(12) United States Patent
Forest et al.

(10) Patent No.: US 9,898,309 B2
(45) Date of Patent: Feb. 20, 2018

(54) WAKE-UP TRIGGER USING MEMS WIND TURBINES

(71) Applicant: Motorola Mobility LLC, Chicago, IL (US)

(72) Inventors: Francis Forest, Chicago, IL (US); Scott Debates, Crystal Lake, IL (US)

(73) Assignee: MOTOROLA MOBILITY LLC, Chicago, IL (US)

(*) Notice: Subject to any disclaimer, the term of this patent is extended or adjusted under 35 U.S.C. 154(b) by 99 days.

(21) Appl. No.: 14/739,340

(22) Filed: Jun. 15, 2015

(65) Prior Publication Data
US 2016/0363982 A1    Dec. 15, 2016

(51) Int. Cl.
*G06F 1/00*     (2006.01)
*G06F 9/44*     (2018.01)
*G06F 1/32*     (2006.01)

(52) U.S. Cl.
CPC .......... *G06F 9/4418* (2013.01); *G06F 1/3206* (2013.01); *G06F 2200/1637* (2013.01)

(58) Field of Classification Search
CPC ..... G06F 1/3203; G06F 9/4418; G06F 1/3206
See application file for complete search history.

(56) References Cited

U.S. PATENT DOCUMENTS

| | | | |
|---|---|---|---|
| 2011/0279359 A1* | 11/2011 | McCarty | G06F 8/38 345/156 |
| 2013/0263054 A1* | 10/2013 | Lee | G06F 3/04817 715/835 |
| 2014/0089703 A1* | 3/2014 | Starr | G06F 1/3293 713/323 |

OTHER PUBLICATIONS www.industrial-needs.com, Flow Meter MiniAir Junior, Apr. 4, 2015, industrial-needs.com.*

* cited by examiner

*Primary Examiner* — Austin Hicks

(57) ABSTRACT

A portable device includes micro-electro-mechanical systems ("MEMS") wind turbines integrated in the portable device. A gesture detection module receives signals generated by the MEMS wind turbines based on movement of the portable device that causes a wind force to be applied to the MEMS wind turbines. The gesture module then recognizes a gesture based on the signals generated from the wind force and initiates an action of the portable device that corresponds to the gesture (e.g., the device is awakened).

20 Claims, 6 Drawing Sheets

WAKE-UP TRIGGER USING MEMS WIND TURBINES

TECHNICAL FIELD

The present disclosure is related generally to mobile communications devices and, more particularly, to detecting user gestures on such devices.

BACKGROUND

Portable devices, such as mobile phones, tablet devices, digital cameras, wearable devices, and other types of computing and electronic devices can be used in a variety of ways. Further, users can provide input in a variety of ways, such as by pressing a button, swiping a touch screen, giving a voice command, and so on. Conventionally, these portable devices required the user to press a button to turn on or wake up the device prior to enabling the user to execute an application or otherwise operate the device. For example, when a user's phone receives an incoming call, the user is generally required to press a button or swipe the touch screen to answer the call. In some instances, the user may have difficulty answering the phone, such as when attempting to swipe the touch screen with a wet finger or failing to properly press the button such that the device fails to connect the call. Further, conventional portable devices can be difficult to operate with the same hand that is holding the device, which many users attempt to do while they are multi-tasking. These difficulties can lead to missed calls or a poor user experience, resulting in user frustration.

In addition, gestures are becoming more common among portable devices as a way for users to provide input. For example, some touch-screen devices can recognize different swipe directions as corresponding to different commands. Generally, however, touch-screen devices require that the touch screen be powered on to enable the device to recognize the gesture.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
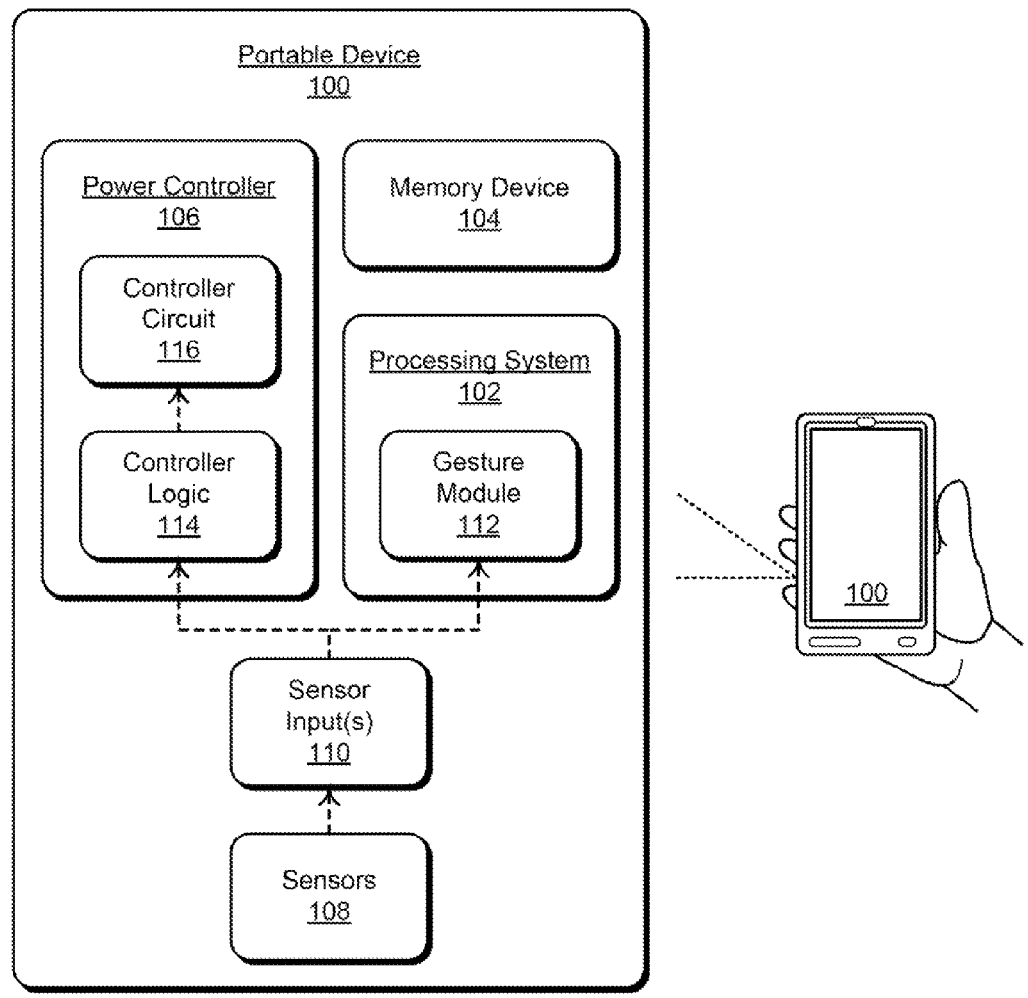
FIG. 1 illustrates an example portable device in which embodiments of using micro-electro-mechanical systems ("MEMS") wind turbines for gesture detection or as a wake-up trigger can be implemented.

Embodiments of using MEMS wind turbines for gesture detection or as a wake-up trigger are described, such as for any type of portable device. Typically, gestures are recognized as a user touching the screen in a certain manner or swiping the screen in a particular direction. Other gestures can be recognized using infra-red sensors to detect movement of a user or the user's hand, for example. However, a portable device such as a mobile device, for example, can fail to recognize some gestures, such as when the user's finger is wet, which interferes with the tactile connection between the user's finger and the touch screen. Additional challenges arise when a user attempts to perform a gesture with the same hand that is holding the mobile device.

A MEMS wind turbine is a miniature wind turbine that generates electrical energy. The MEMS wind turbine can be integrated in a portable device such that air flowing substantially parallel to a plane formed by the blades of the MEMS wind turbine causes the MEMS wind turbine to rotate. Alternatively, the MEMS wind turbine can be integrated with the portable device such that air flowing substantially perpendicular to a plane formed by the blades of the MEMS wind turbine can cause the MEMS wind turbine to rotate. In implementations, the MEMS wind turbines can be formed from two-dimensional pieces utilizing planar multilayer electroplating techniques assembled into a three-dimensional structure.

In aspects of gesture detection using MEMS wind turbines, a portable device can be implemented to recognize a gesture based on sensory input generated by the MEMS wind turbines. For example, when a user lifts the portable device to answer a phone call, wind forces cause some of the MEMS wind turbines to rotate and generate a signal. Then, based on the signal generated by the MEMS wind turbines, the portable device can wake up a display device of the portable device or automatically connect the call for the user, without requiring additional user interaction, such as a button-press, a screen-swipe, and so on.

In implementations of a wake-up trigger using MEMS wind turbines, a portable device is implemented to determine movement based on signals generated by the MEMS wind turbines. For example, when a user lifts the portable device from the user's waist up to near the user's face (or just generally moves the device up), the display device can be turned on automatically. In implementations, a state change can be triggered to initiate power to components of the portable device, such as the display screen, a microphone, and so on. The state change effectively wakes up the components, such as from a sleep state, a hibernating state, an off state, and so on. In this way, movement of the portable device can cause the portable device to wake up, without the use of accelerometers or gyroscopes, and without additional user interaction. For example, the portable device can be in a state that is not drawing any power, and then the portable device can be lifted or moved in such a way to generate wind sufficient to activate the MEMS wind turbines, which can trigger the portable device, or components of the portable device, to be turned on.

While features and concepts of using MEMS wind turbines for gesture detection or as a wake-up trigger can be implemented in any number of different devices, systems, environments, or configurations, embodiments of using MEMS wind turbines for gesture detection or as a wake-up trigger are described in the context of the following example devices, systems, and methods.

FIG. 1 illustrates an example portable device 100 in which embodiments of using MEMS wind turbines for gesture detection or as a wake-up trigger can be implemented. The example portable device 100 may be any type of mobile device (e.g., mobile phone, tablet device, digital camera, and so on), wearable device (e.g., watch, glasses, bracelet, hearing aid-like device, and any other item that is wearable by a user and which has electronic or computing technologies incorporated therein), or other types of computing and electronic devices that are typically battery powered. In this example, the portable device 100 includes a variety of hardware components, examples of which include a processing system 102, an example of a computer-readable storage medium illustrated as a memory device 104, a power controller 106, and so on. The processing system 102 is representative of functionality to perform operations through execution of instructions stored in the memory device 104. Although illustrated separately, functionality of these components may be further divided, combined (e.g., on an application-specific integrated circuit), and so forth. The portable device 100 can include sensors 108 that detect movement of the portable device 100 and provide sensor inputs 110 to the components of the portable device 100. In embodiments, the sensors 108 are implemented as MEMS wind turbines, as shown and described below with reference to FIGS. 2 and 3. Additionally, the processing system 102 includes a gesture module 112 for detecting gestures of a user of the portable device 100 based on the sensor inputs 110 from the sensors 108. Also illustrated is the power controller 106 including controller logic 114 and a controller circuit 116 that are further described below with reference to features of the wake-up trigger.

The gesture module 112 represents functionality of the portable device 100 to recognize a variety of different gestures from sensory input generated by the sensors 108 and to then initiate an action of the portable device 100 that corresponds to the gesture. For example, the gesture module 112 can determine a change in orientation of the portable device 100 and initiate a corresponding change to a user interface displayed on a display device of the portable device 100. In an additional example, the gesture module 112 can determine that the portable device 100 is being lifted while the portable device 100 is receiving an incoming call, such as a phone call, a text message, an instant message, and so on, and can automatically initiate connecting the call. Other examples include determining that the portable device 100 is being positioned to initiate a phone call and initiating a display of a user interface that is configured to enable the user to initiate the phone call. Thus, the gesture module 112 can recognize any of a variety of different gestures and initiate a corresponding action of the portable device 100. These examples are illustrated as non-exclusive examples of the functionality provided by the gesture module 112 and are not intended to be limiting in any way.

The portable device 100 includes the power controller 106 that is implemented to initiate a state change of one or more components of the portable device 100. The power controller 106 is implemented to receive signals as a sensor input 110 from the sensors 108, and then the controller logic 114 initiates the controller circuit 116 to implement a state change of the one or more components. In implementations, the power controller 106 can be implemented with hardware components which can be activated while a processor of the portable device 100 is in an off state.

Additionally, the portable device 100 can be implemented with any number and combination of differing components as further described with reference to the example device shown in FIG. 6. As an alternative to hardware components, the power controller 106 can be implemented as a software application or module, such as executable software instructions (e.g., computer-executable instructions) that are executable with the processing system 102 of the device 100. The power controller 106 can be stored on computer-readable storage memory (e.g., the memory device 104), such as any suitable memory device or electronic data storage implemented in the portable device 100. In practice, the power controller 106 may be implemented in software as part of an operating system of the portable device 100. Additionally, a separate microcontroller may be implemented to process the power controller 106 as software.

In this example, the power controller 106 includes a controller circuit 116 that switches states of various components of the portable device 100. The power controller 106 also includes controller logic 114 that controls the controller circuit 116. As with the power controller 106, the controller logic 114 may be implemented in hardware, software, or as a combination thereof.

The portable device 100 also includes the one or more sensors 108, which may be implemented as MEMS wind turbines. The MEMS wind turbines can be integrated in the portable device 100 in any of a variety of ways. For example, the MEMS wind turbines can be recessed in a housing of the portable device 100 and within a channel that allows air flow. Movement of the portable device 100 can cause air to flow through the channel and over the MEMS wind turbines causing the MEMS wind turbines to rotate and generate a signal. Further discussion of this and other aspects is provided below.

Figure 2:
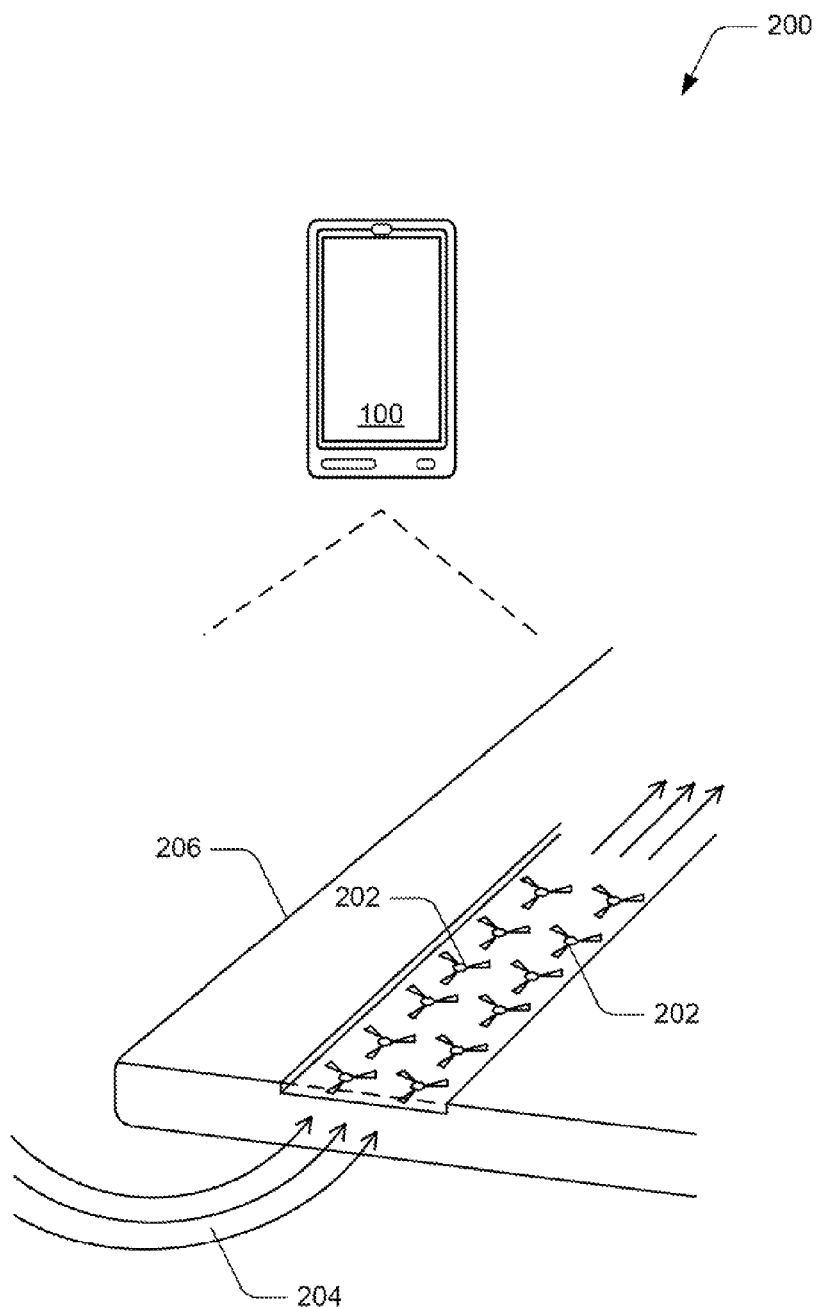
FIG. 2 illustrates example sensor configurations in which embodiments of using MEMS wind turbines for gesture detection or as a wake-up trigger can be implemented.

FIG. 2 illustrates an example 200 of a sensor configuration in which embodiments of using MEMS wind turbines for gesture detection or as a wake-up trigger can be implemented. As shown in the example 200, the portable device 100 includes MEMS wind turbines 202 that act as sensors to detect air flow (e.g., wind 204) caused by movement of the portable device 100. In implementations, the MEMS wind turbines 202 are examples of the sensors 108 that detect movement of the portable device 100, as described above with reference to FIG. 1. As the wind 204 passes over the MEMS wind turbines 202, associated wind forces can cause the MEMS wind turbines 202 to rotate and generate a signal (e.g., as a sensor input 110 to other components of the portable device 100). The signal can be in any of a variety of forms, such as a voltage, for example. As shown in FIG. 2, the MEMS wind turbines 202 can be recessed within a housing 206 of the portable device 100, such as within a channel that allows air to pass through. In implementations, the MEMS wind turbines 202 can be located on the back, front, or along the sides of the housing 206 of the portable device 100. Further, the MEMS wind turbines 202 can be integrated at any location on the portable device 100 that is suitable to allow wind forces to initiate rotation of the MEMS wind turbines 202.

Figure 3:
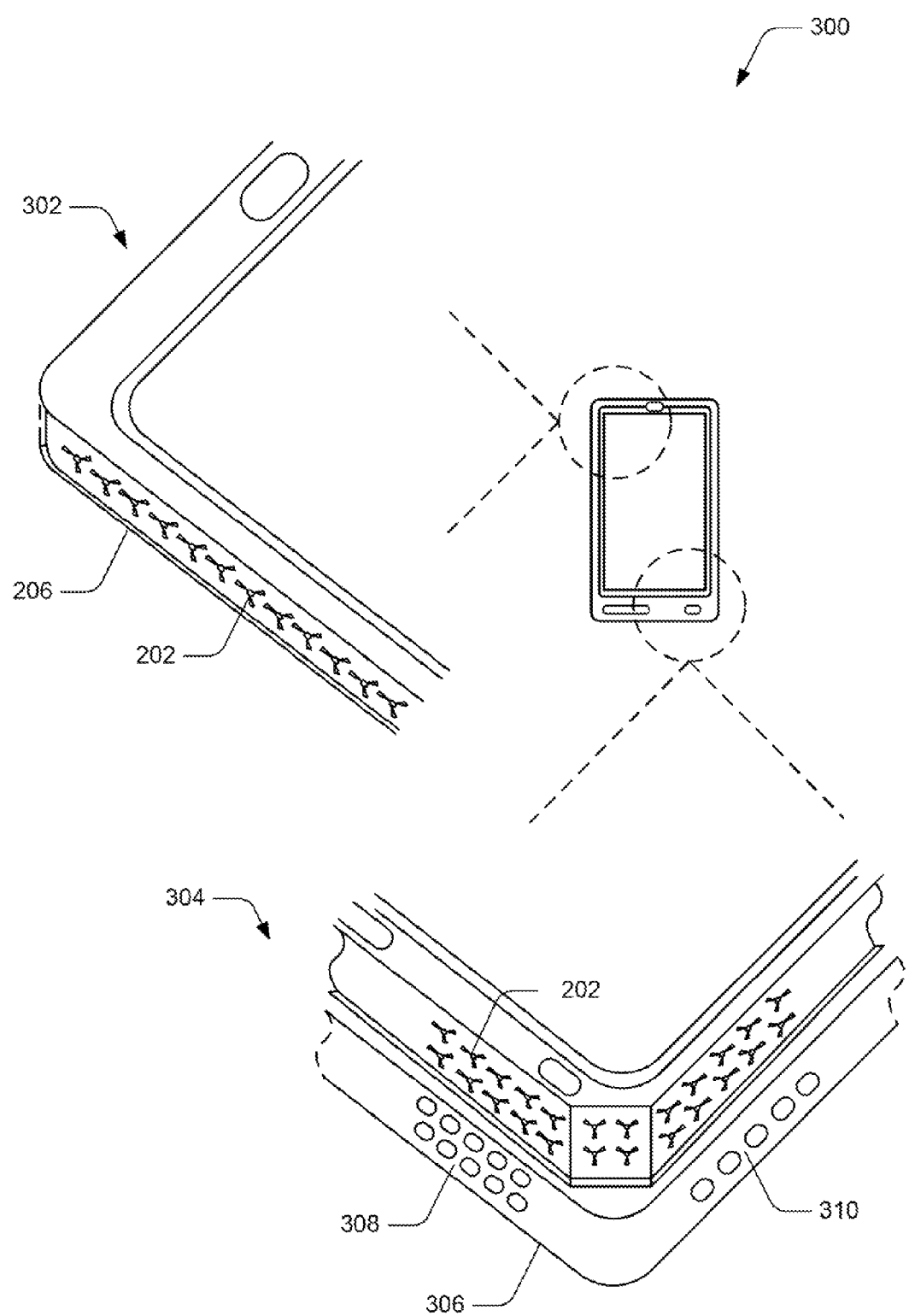
FIG. 3 further illustrates examples of sensor configurations in which embodiments of using MEMS wind turbines for gesture detection or as a wake-up trigger can be implemented.

FIG. 3 illustrates additional examples 300 of various sensor configurations in which embodiments of using MEMS wind turbines for gesture detection or as a wake-up trigger can be implemented. In implementations, the MEMS wind turbines 202 can be integrated in the portable device 100 in various locations. For example, the MEMS wind turbines 202 can be disposed on one or more sides of the portable device 100 (e.g., integrated in the housing 206), such as shown in an example 302. The MEMS wind turbines 202 can be recessed within the housing 206 of the portable device 100 along one or more sides of the device. As shown in an example 304, the MEMS wind turbines 202 can be located at or near the corners of the housing of the portable device 100. In implementations, the recessed portion of the portable device 100 can be angled at the corner to allow one or more of the MEMS wind turbines 202 to be integrated thereon. In addition, the housing 206 can include a perforated surface 306 over the MEMS wind turbines 202, where the perforations (e.g., holes or partial openings) in the surface allow wind to pass through and over the MEMS wind turbines 202. Any of a variety of configurations of perforations can be used, such as, for example, configurations 308 or 310.

Generally, any services, components, modules, methods, or operations described herein can be implemented using software, firmware, hardware (e.g., fixed-logic circuitry), manual processing, or any combination thereof. Some operations of the example methods may be described in the general context of executable instructions stored on computer-readable storage memory that is local or remote to a computer processing system, and implementations can include software applications, programs, functions, and the like. Any of the functionality described herein can be performed, at least in part, by one or more hardware logic components, such as, and without limitation, field-programmable gate arrays, application-specific integrated circuits, application-specific standard products, system-on-a-chip systems, complex programmable logic devices, and the like.

Figure 4:
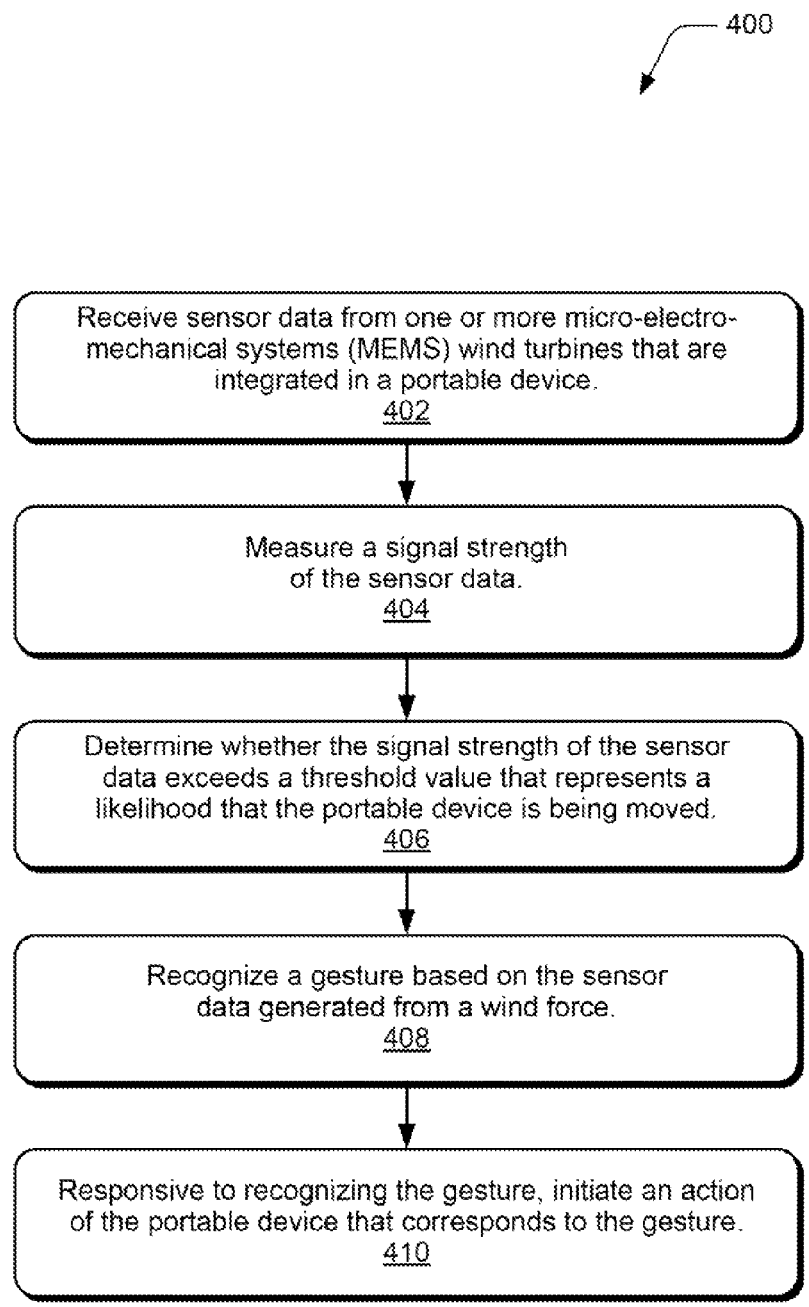
FIG. 4 illustrates example methods of gesture detection using MEMS wind turbines in accordance with one or more embodiments.

FIG. 4 illustrates example methods 400 of gesture detection using MEMS wind turbines. The order in which the method is described is not intended to be construed as a limitation, and any number or combination of the described method operations can be performed in any order to perform a method or an alternate method.

At 402, sensor data are received from MEMS wind turbines that are integrated in a portable device. For example, as the portable device is lifted or otherwise moved, such as from the user's waist level to the user's head level, a relatively small wind force is generated in relation to the portable device. Depending on an orientation of the portable device when moving through the air, some of the MEMS wind turbines 202 may generate a signal while others do not. For example, the wind force may cause MEMS wind turbines near a top corner of the portable device to rotate without affecting MEMS wind turbines located near a bottom corner. As an alternative example, MEMS wind turbines located near a first corner can generate a first signal based on the wind force, while other MEMS wind turbines near a second corner of the portable device generate a second signal, such as a counter-signal, that can be used in connection with the first signal. Accordingly, differences in sensor data or counter-signals generated by different MEMS wind turbines on the portable device can be used to determine a variety of different information, such as device orientation in three-dimensional space, context of a user using the portable device, gestures or input to perform a function of the portable device, and so on.

At 404, a signal strength of the sensor data is measured. This step can be performed in any suitable way. For example, the gesture module 112 that is implemented in the portable device 100 can measure the signal strength of the sensor data generated by the MEMS wind turbines 202. At 406, a determination is made as to whether the signal strength of the sensor data exceeds a threshold value that represents a likelihood that the portable device 100 is being moved. For example, the threshold value can be used to determine whether the portable device 100 was inadvertently bumped or moved, or whether the portable device 100 was intentionally moved as part of a gesture. In an additional example, the threshold can be used to determine the difference between a gesture being performed and the user walking or running. Any suitable threshold value can be used, such as a predefined static threshold, a dynamically adjustable threshold (e.g., a threshold based on machine learning of the device's characteristic motions), multiple thresholds, or any combination thereof. In implementations, the threshold can include a duration of time over which the sensor input is continuously received.

At 408, a gesture is recognized based on the sensor data generated from the wind force. For example, the gesture module 112 that is implemented in the portable device 100 can utilize the sensor data generated by the MEMS wind turbines 202 and received as the sensor inputs 110 to recognize a gesture. Any of a variety of gestures can be recognized. Some examples include, but are not limited to, the portable device 100 being lifted to answer an incoming phone call, positioned to initiate a phone call, lowered after a phone call is disconnected, oriented to change an orientation of the portable device 100, and so on.

At 410, an action of the portable device 100 that corresponds to the gesture is initiated responsive to recognizing the gesture. For example, based on the gesture, the gesture module 112 can initiate any of a variety of different actions of the portable device 100. Some examples include, but are not limited to, connecting the incoming phone call, initiating a display of a user interface configured to enable the user to initiate the phone call, turning off a display device of the portable device 100, changing an orientation of the user interface displayed on the display device of the portable device 100, initiating mute, initiating silent mode or airplane mode, and so on.

Figure 5:
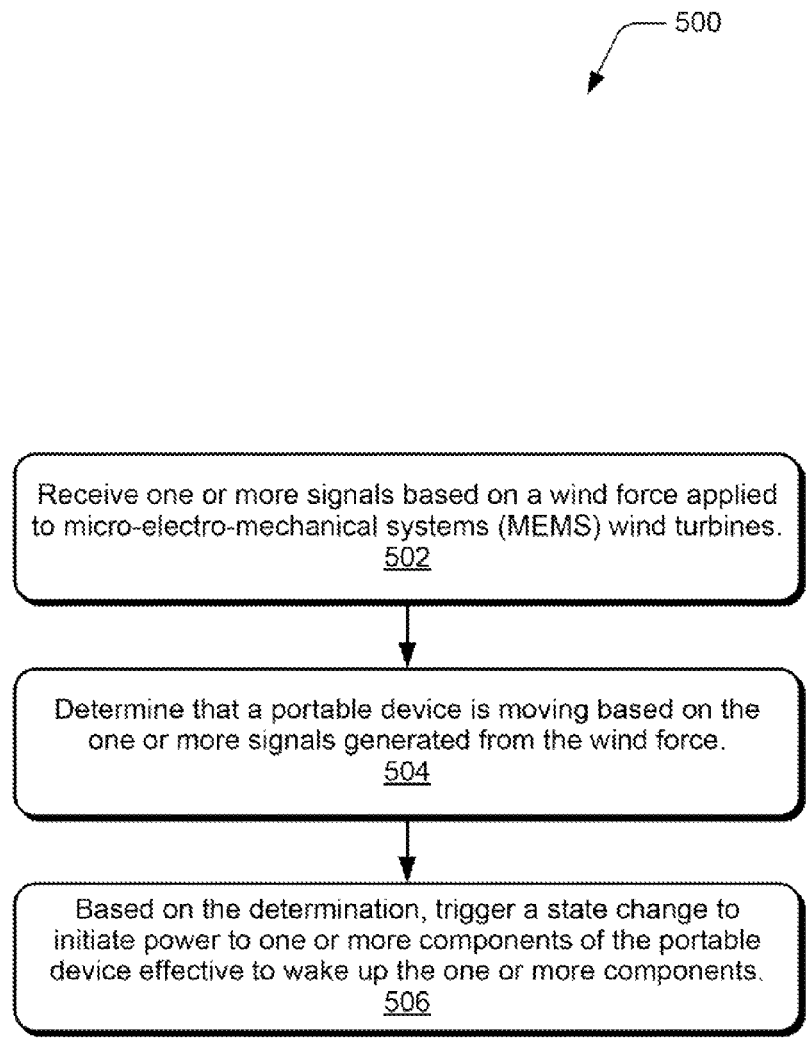
FIG. 5 illustrates example methods of a wake-up trigger using MEMS wind turbines in accordance with one or more embodiments.

FIG. 5 illustrates example methods 500 of using MEMS wind turbines as a wake-up trigger. The order in which the method is described is not intended to be construed as a limitation, and any number or combination of the described method operations can be performed in any order to perform a method or an alternate method.

At 502, one or more signals are received based on a wind force applied to MEMS wind turbines. For example, the power controller 106 that is implemented in the portable device 100 receives signals (e.g., sensor inputs 110) generated by the sensors 108 (e.g., MEMS wind turbines 202). The signals can be generated by the MEMS wind turbines 202 based on a wind force effective to initiate rotation of at least some of the MEMS wind turbines 202.

At 504, the portable device is determined to be moving based on the one or more signals generated from the wind force. For example, the power controller 106 can determine that the sensor inputs 110 from the MEMS wind turbines 202 are continuously sufficient to exceed a duration of time or a threshold signal strength that indicates a likelihood of movement of the portable device 100.

At 506, a state change is triggered to initiate power to one or more components of the portable device 100 effective to wake up the one or more components. For example, the power controller 106 can, based on the determination that the portable device 100 is moving, initiate power to turn on a display device, a microphone, an audio system, or any other component of the portable device 100. In implementations, an interrupt signal can be sent to the processing system to initiate power to any of the components.

Figure 6:
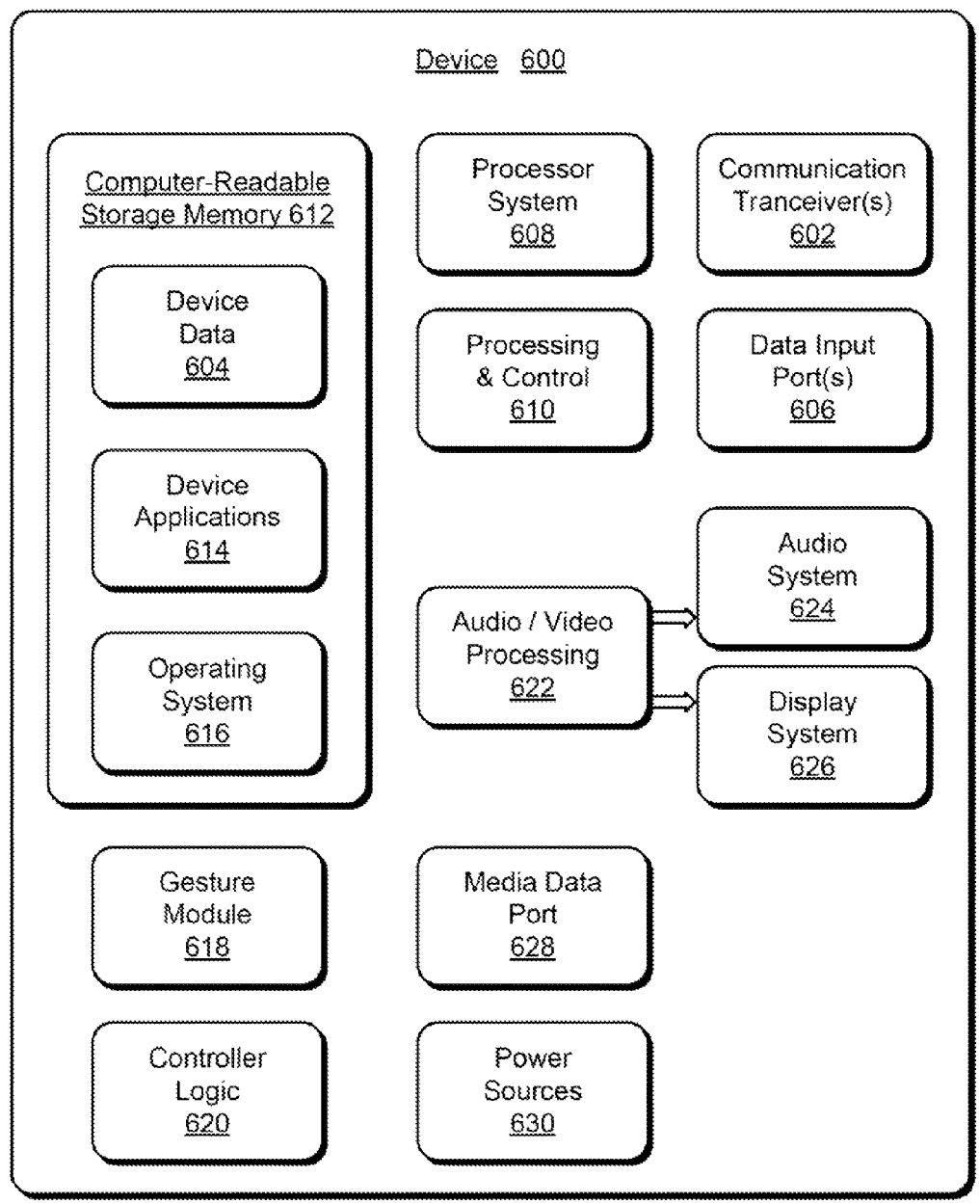
FIG. 6 illustrates various components of an example device that can implement embodiments of using MEMS wind turbines for gesture detection or as a wake-up trigger.

FIG. 6 illustrates various components of an example device 600 in which embodiments of using MEMS wind turbines for gesture detection or as a wake-up trigger can be implemented. The example device 600 can be implemented as any of the computing devices described with reference to the previous FIGS. 1 through 5, such as any type of client device, mobile phone, tablet, computing, communication, entertainment, gaming, media playback, wearable, or other type of device. For example, the portable device 100 shown in FIG. 1 may be implemented as the example device 600.

The device 600 includes communication transceivers 602 that enable wired or wireless communication of device data 604 with other devices. Additionally, the device data 604 can include any type of audio, video, or image data. Example transceivers include wireless personal area network radios compliant with various IEEE 802.15 standards, wireless local area network radios compliant with any of the various IEEE 802.11 standards, wireless wide area network radios for cellular phone communication, wireless metropolitan area network radios compliant with various IEEE 802.15 standards, and wired local area network Ethernet transceivers for network data communication.

The device 600 may also include one or more data input ports 606 via which any type of data, media content, or inputs can be received, such as user-selectable inputs to the device 600, messages, music, television content, recorded content, and any other type of audio, video, or image data received from any content or data source. The data input ports may include universal serial bus ports, coaxial cable ports, and other serial or parallel connectors (including internal connectors) for flash memory, digital versatile discs, compact discs, and the like. These data input ports 606 may be used to couple the device 600 to any type of components, peripherals, or accessories such as microphones or cameras.

The device 600 includes a processing system 608 of one or more processors (e.g., any of microprocessors, controllers, and the like) or a processor and memory system implemented as a system-on-chip that processes computer-executable instructions. The processor system may be implemented at least partially in hardware, which can include components of an integrated circuit or on-chip system, an application-specific integrated circuit, a field-programmable gate array, a complex programmable logic device, and other implementations in silicon or other hardware. The device 600 can be implemented with any one or combination of software, hardware, firmware, or fixed-logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 that enables data storage, such as data-storage devices that can be accessed by a computing device 600, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random-access memory, read-only memory, flash memory, and other types of storage media in various memory-device configurations. The device 600 may also include a mass-storage media device.

The computer-readable storage memory 612 provides data-storage mechanisms to store the device data 604, other types of information or data, and various device applications 614 (e.g., software applications). For example, an operating system 616 can be maintained as software instructions within a memory device and executed by the processing system 608. The device applications 614 may also include a device manager, such as any form of a control application, software application, signal-processing and control module, code that is native to a particular device, a hardware abstraction layer for a particular device, and so on. In this example, the device 600 includes a gesture module 618 that implements embodiments of gesture detection using MEMS wind turbines and includes controller logic 620 that implements embodiments of wake-up triggers using MEMS wind turbines. The gesture module 618 and the controller logic 620 may be implemented with hardware components or in software, such as when the device 600 is implemented as the portable device 100 described with reference to FIGS. 1 through 5. An example of the gesture module 618 is the gesture module 112 that is implemented by the portable device 100, and an example of the controller logic 620 is the controller logic 114 that is also implemented by the portable device 100.

The device 600 also includes an audio or video processing system 622 that generates audio data for an audio system 624 or generates display data for a display system 626. The audio system or the display system may include any devices that process, display, or otherwise render audio, video, display, or image data. Display data and audio signals can be communicated to audio component or to a display component via a radio-frequency link, S-video link, high-definition multimedia interface, composite-video link, component-video link, digital video interface, analog audio connection, or other similar communication link, such as media data port 628. In implementations, the audio system or the display system are integrated components of the example device 600. Alternatively, the audio system or the display system are external, peripheral components to the example device 600.

The device 600 can also include one or more power sources 630, such as when the device 600 is implemented as a portable device. The power sources 630 may include a charging or power system, and can be implemented as a flexible-strip battery, a rechargeable battery, a charged super-capacitor, or any other type of active or passive power source.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:
1. A method for detecting a wake-up trigger for a portable device, the method comprising:
receiving a signal based on a wind force applied to micro-electro-mechanical systems ("MEMS") wind turbines that are integrated in the portable device proximate to one another within a recessed channel of the portable device, the wind force applied based on movement of the portable device;
receiving the signal generated from the wind force as an indicator that the portable device is moving; and
based on the indicator that the portable device is moving, triggering a state change to initiate power to a component of the portable device effective to wake up the component.

2. The method of claim 1 wherein the state change is triggered by an interrupt signal sent to a processor of the portable device.

3. The method of claim 1 wherein the state change is triggered by waking-up the portable device from a sleep state.

4. The method of claim 1 wherein the state change is triggered by turning on the portable device from an off state.

5. The method of claim 1 wherein the state change activates a microphone.

6. The method of claim 1 wherein the state change turns on a display device.

7. The method of claim 1 wherein the signal generated from the wind force includes a switch signal that represents actuation of a power button of the portable device.

8. The method of claim 1 wherein the MEMS wind turbines are recessed below a surface of a housing of the portable device.

9. The method of claim 1 wherein the indicator that the portable device is moving is based on the signal generated from the wind force having a signal strength that exceeds a threshold value.

10. A portable device comprising:
micro-electro-mechanical systems ("MEMS") wind turbines integrated in the portable device, the MEMS wind turbines including a subset of the MEMS wind turbines disposed proximate to one another within a recessed channel of the portable device; and
a memory and processing system to implement a power controller that is configured to:
receive a signal generated by the MEMS wind turbines based on movement of the portable device that causes a wind force to be applied to the MEMS wind turbines, the signal received as an indicator that the portable device is moving; and
based on the indicator that the portable device is moving, trigger a state change to initiate power to a component of the portable device effective to wake up the component.

11. The portable device of claim 10 wherein the state change is triggered by an interrupt signal sent to a processor of the portable device.

12. The portable device of claim 10 wherein the state change is triggered by the portable device being turned on from an off state.

13. The portable device of claim 10 wherein the state change is triggered by the portable device waking up from a hibernating state.

14. The portable device of claim 10 wherein the state change turns on a display device.

15. The portable device of claim 10 wherein the signal generated from the wind force includes a switch signal that represents actuation of a power button of the portable device.

16. The portable device of claim 10 wherein the MEMS wind turbines are recessed below a surface of a housing of the portable device.

17. The portable device of claim 10 wherein the indicator that the portable device is moving is based on the signal generated from the wind force having a signal strength that exceeds a threshold value.

18. A system comprising:
micro-electro-mechanical systems ("MEMS") wind turbines integrated in a portable device and configured to generate a signal based on wind forces applied to the MEMS wind turbines, the wind forces caused by movement of the portable device, two or more of the MEMS wind turbines having separate rotational axes and being disposed proximate to one another within a recessed channel of a housing of the portable device;
a memory and processing system to implement a power controller that is configured to:
receive the signal generated based on the wind forces caused by the movement of the portable device, the signal received as an indicator that the portable device is moving; and
responsive to the indicator that the portable device is moving, trigger a state change to initiate power to a component of the portable device effective to wake up the component.

19. The system of claim 18 wherein the state change is triggered by the portable device waking up from a sleep state.

20. The system of claim 18 wherein the signal generated from the wind force includes a switch signal that represents actuation of a power button of the portable device.

* * * * *